United States Patent [19]

Matthews

[11] 4,195,398

[45] Apr. 1, 1980

[54] PULLING TOOL

[76] Inventor: Robert L. Matthews, Rte. #11, Box 114, Baton Rouge, La. 70811

[21] Appl. No.: 859,820

[22] Filed: Dec. 12, 1977

[51] Int. Cl.[2] .............. B23P 19/04

[52] U.S. Cl. .............. 29/262

[58] Field of Search .............. 29/261, 262, 259, 260

[56] References Cited

U.S. PATENT DOCUMENTS

| | | | |
|---|---|---|---|
| 1,650,023 | 11/1927 | Maxwell | 29/262 |
| 1,650,024 | 11/1927 | Maxwell | 29/262 |
| 1,650,964 | 11/1927 | Schmitt | 29/262 |
| 3,241,223 | 3/1966 | Anderson | 29/259 |

FOREIGN PATENT DOCUMENTS

| | | | |
|---|---|---|---|
| 1045330 | 11/1958 | Fed. Rep. of Germany | 29/261 |
| 1162286 | 4/1958 | France | 29/261 |

*Primary Examiner*—James L. Jones, Jr.

*Attorney, Agent, or Firm*—Russell D. Weaver; Murray Robinson; Ned L. Conley

[57] ABSTRACT

A pulling tool comprises a brace having a base and two legs, a pulling means including a threaded shaft extending through an untreaded passage in the base, and a first nut screwed onto the shaft on the side of the brace opposite from the legs, a second nut screwed onto the shaft on the other side of the brace, and two hooks pivotally connected to the second nut extending between the legs, and spreader means comprising wedging surfaces on the stems of the hooks, a conical tip on the end of the shaft adjacent thereto, and a rectangular head on the other end of the shaft, the legs being long enough to accommodate the hooks and second nut and providing access thereto between the legs.

6 Claims, 2 Drawing Figures

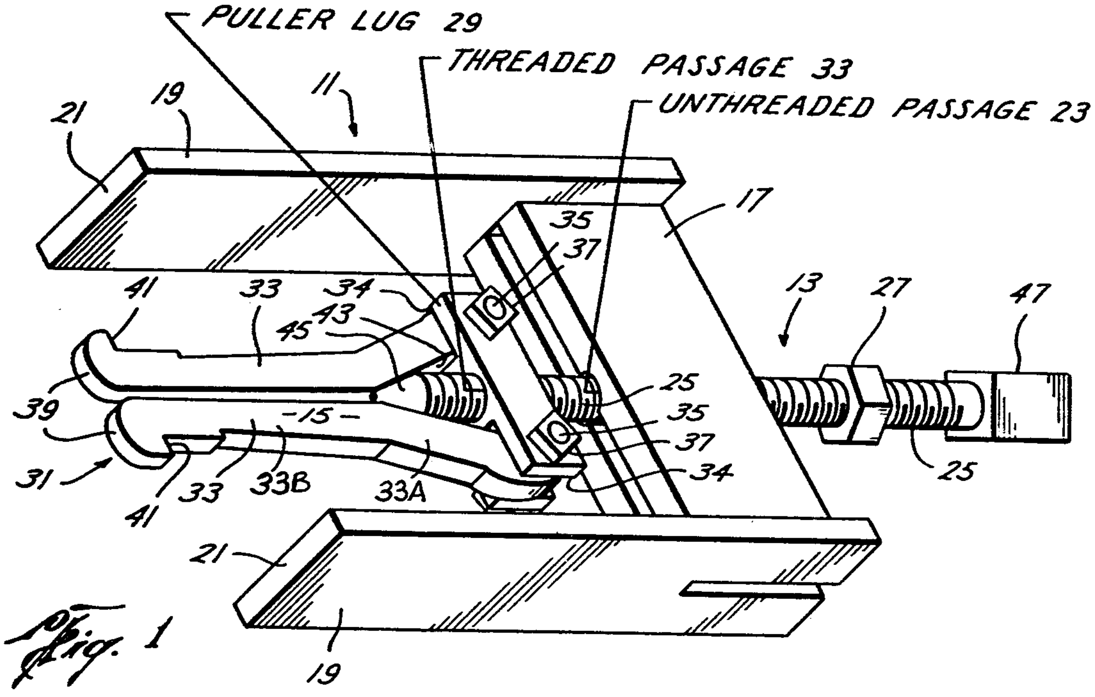
Fig. 1
Fig. 2
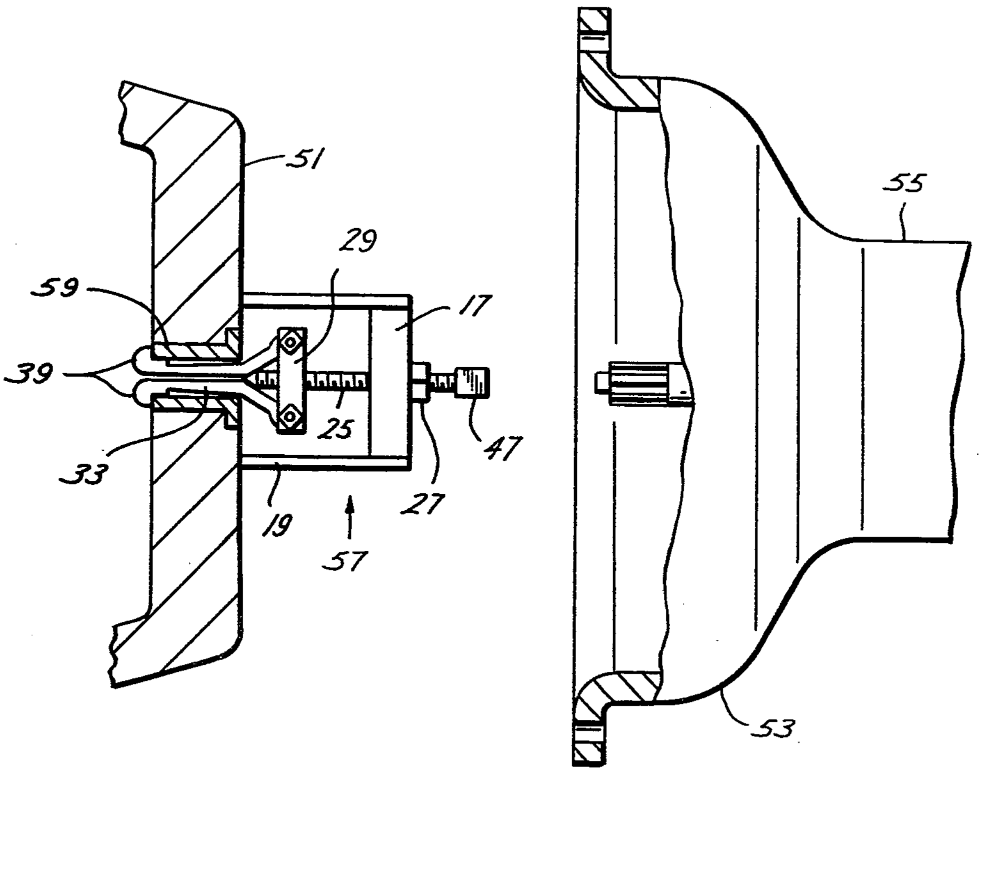

PULLING TOOL

BACKGROUND OF THE INVENTION:

(a) Field of the Invention

This invention relates to force applicators more particularly to bearing pullers.

(b) Description of the Prior Art

It is known to pull one member from another by engaging two or more pivotally mounted hooks with the one member and exerting force between the other member and the hooks with a screw jack resting on the other member as shown in U.S. Pat. Nos. 3,797,095 - Benson, 3,990,139 - Touchet.

Such a tool employing springs acting on the hook stems to move them into engaging position is shown in U.S. Pat. No. 3,402,455 - Converse, and in U.S. Pat. No. 3,964,149 - Hugh, it is disclosed that set screws may be employed to position the hook stems, and in U.S. Pat. No. 3,089,229 - Brodie, the stems are gripped by locking guides.

A similar tool shown in U.S. Pat. No. 4,007,535 - Brandt, employs a second screw to position the hook stems. A simplification is effected in the tools of the U.S. Pat. Nos. 2,971,254 - Fairfield, 3,588,983 - Hay, by using the same screw jack for both purposes but there is a restriction imposed in that the stem movement must always be of the same amount.

A similar tool in which but a single threaded shaft is employed and which is engaged by separate nuts for effecting movement of the hook stems and exerting axial force is shown in U.S. Pat. No. 3,810,294 - Link. The Link tool is designed to grip the one member from the outside moving radially inwardly and the screw jack obtains its purchase by bearing against the shaft inside the member to be removed.

SUMMARY OF THE INVENTION

According to the invention there is provided a special purpose screw jack pulling tool of the type having pivoted hooks actuated by the threaded shaft of the jack. The jack comprises a base having an unthreaded passage through which extends a threaded shaft having a nut engageable with the base. A nut on the shaft is engageable with the brace to exert axial force on the shaft. Two hooks are pivotally connected to a second nut on the threaded shaft on the opposite side of the base. Hook spreading means comprises wedging surfaces on the stems of the hooks engaged by a conical tip on the threaded shaft, the shaft having a head whereby it can be turned.

The tool is adapted for removal of a bearing or sleeve of the clutch unit of an automotive truck, such bearing or sleeve being the one through which the output shaft extending between the transmission and the clutch is disposed. The hooks are adapted to be moved axially inside the bearing and spread outwardly to engage the far end of the bearing. The screw jack base has standoff legs to engage the clutch unit at the flat surface facing toward the transmission, thereby to provide purchase for the screw jack at a radial distance from the bearing axis sufficient to accomodate the bearing when it has been pulled. Since the shaft passes freely through the passage in the base, its position relative thereto is easily and quickly adjusted when the hooks are positioned at the end of the bearing.

BRIEF DESCRIPTION OF THE DRAWINGS

For a detailed description of a preferred embodiment of the invention reference will be made to the accompanying drawings wherein:

FIG. 1 is a pictorial view of a preferred embodiment of the tool embodying the invention, and FIG. 2 is a partial axial section of a portion of the transmission mechanism of an automotive truck showing the transmission and clutch housing separated from the engine such that the clutch unit is exposed and the output shaft is completely removed from the clutch unit. In all figures of the drawings the markings of the surfaces and section are conventional and show that all parts are made of metal, preferably steel.

DESCRIPTION OF THE PREFERRED EMBODIMENT

Referring now to FIG. 1 there is shown a pulling tool including a brace 11, a puller 13, and a spreader 15.

The brace, which is U shaped, includes a base 17 formed of two parallel, spaced apart, rectangular cross section plates. Two rectangular cross-section legs 19 each have one end rigidly connected to a different end of base 17. Each leg is connected to both plates of the base thereby integrating them. The legs are of equal length so that their flat ends 21 are coplanar. At the center of base 17 is an unthreaded smooth cylindrical passage 23 parallel to legs 19.

The puller includes a single-piece threaded cylindrical shaft or screw 25 extending through passage 23. A nut 27, internally cylindrically threaded correlative to shaft 25, is disposed about the shaft. When the nut is screwed down into engagement with base 17, further turning of the nut in the same direction causes the shaft to move relative to the brace, thereby to exert a force on whatever is connected to the shaft.

Puller 13 further includes an H shaped nut 29 internally cylindrically threaded correlative to shaft 25. Two single-piece hooks 31 have stems 33, each having a first portion 33A adjacent nut 29 and extending generally away from base 17 and a second portion 33B adjoining first portion 33A at a point removed from nut 29 and extending generally away from the base in a direction substantially parallel to the axis of shaft or screw 25. One end of each stem lies in one of channels 34 in nut 29 and is pivotally connected to nut 29 by rivets, pivot pins, or bolts 35 secured by nuts 37. The other end of each stem is provided with an out turned flange 39 having a plane face 41. The point at which second portion 33B of each hook adjoins first portion 33A of each hook is the point farthest removed from nut 29. The first portion and the second portion form an obtuse angle, with respect to one another. Flange 39 is disposed at the end of second portion 33B farthest removed from first portion 33A.

When hook flanges 39 of the puller are engaged with a bearing and legs 19 of the brace rest on a fixed surface such as a clutch plate and puller nut 27 is turned, the puller hooks pull the bearing away from the surface.

Spreader 15 includes inwardly curved wedge surfaces 43 on hook stems 33. A conical tip 45 on one end of shaft 25 provides a further wedge surface correlative, to wedge surfaces 43. The other end of shaft 25 is provided with a rectangular head 47 for engaging a wrench to turn the shaft. When the shaft is advanced into nut 29, the wedge surfaces 43 are forced apart by conical tip 45, thereby spreading hooks 31. When shaft 25 is retracted, the hooks can be manually moved together, in which position they can be inserted through the inner periphery of a bearing.

From the foregoing it will be seen that shaft 25 and lug 29 form parts of both the puller and the spreader.

Referring now to FIG. 2, there are shown clutch unit 51, clutch housing 53, output shaft 54 and transmission 55 of an automotive truck. The clutch housing and transmission have been moved back far enough to admit the pulling tool 57 of the invention. Flanges 39 on the ends of the puller hooks are shown as positioned against the front end of shaft bearing 59, the shaft having been removed. Legs 19 of the tool bear against clutch plate 51. By turning puller nut 27, the bearing is withdrawn from plate 51. It will be seen that legs 19 have a length as great as that of hooks 33 and lug 29 combined so that the latter can be fully received between legs 19 when nut 27 is turned far enough to withdraw bearing 39.

In setting up to use the tool, the bolts normally securing clutch housing 53 to the engine of the truck are removed and clutch housing 53, together with transmission 55, are separated from the engine of the truck so as to expose clutch unit 51 and to remove output shaft 54 from clutch unit 51. This exposes one end of shaft bearing 59. The bearing puller is then placed against clutch unit 51 with the brace legs 19 abutting the flat surface of clutch unit 51 facing transmission 55. Threaded shaft 25 is then slid forward through unthreaded base passage 23 until the puller flanges pass the front shoulder of bearing 59.

Spreader nut 47 is then turned while puller nut 29 is held steady causing the shaft tip to engage the wedging surfaces on the puller hook stems and spread the hooks apart as much as possible.

Puller nut 47 is then threaded toward base 17. When the puller nut engages base 17, shaft 25 will be forced rearwardly, causing the hook flanges to engage the front shoulder of the bearing. Continued threading of the pulling nut pulls the bearing from the clutch unit.

The bearing puller of the invention permits removal of the shaft bearing without moving the transmission very far from its original position.

While a preferred embodiment of the invention has been shown and described, modifications thereof can be made by one skilled in the art without departing from the spirit of the invention.

I claim:

1. A pulling tool comprising:

a brace having a base and leg means for supporting the base relative to a surface, said leg means extending from the base in one direction, the base having a passage extending therethrough in the same general direction, a single-piece, threaded shaft extending through said passage and free to slide axially therein without rotation, a first nut having an internal thread correlative to that of the shaft screwed on the shaft on the side of the base opposite from the leg means and adapted to engage the base and be turned to exert a pulling force on the shaft, an H-shaped second nut having an internal thread correlative to that of the shaft and a first and a second channel formed by the H-shape of the nut, said second nut being screwed on to the shaft on the same side of the base as said leg means, a single-piece first hook having one end received in said first channel of said second nut and first connecting means for pivotally connecting said one end of said first hook to the sides of said first channel, a single-piece second hook having one end received in said second channel of said second nut and second connecting means for pivotally connecting said one end of said second hook to the sides of said second channel, said first and second hooks each having a first portion adjacent said second nut and extending generally away from the base a second portion adjoining said first portion at the point of said first portion farthest removed from said second nut and extending generally away from the base in a direction substantially parallel to the axis of said shaft, said second portion and said first portion forming an obtuse angle with respect to one another, said first portions of said hooks provided with wedging surfaces diverging from each other progressing in a direction toward said base, one end of said shaft having a conical tip engageable with said wedging surfaces to spread said hooks apart, and means on the other end of said shaft for facilitating turning of the shaft, said second portions of said hooks having a flange at the end of said second portions farthest removed from said first portions.

2. Tool according to claim 1 in which the leg means is at least as long as the hooks and second nut.

3. Tool according to claim 1 in which the leg means comprises two legs connected at one end to the base at opposite sides thereof forming a U-shaped member, the hook members and second nut being accessible through the spaces between the legs.

4. Tool according to claim 3 in which the legs are rigidly affixed to the base and are of an equal length that is greater than the combined length of the second nut and the hooks connected thereto.

5. Tool according to claim 1 in which the wedging surfaces have a taper angle correlative to that of the conical tip of the shaft.

6. Tool according to claim 1 in which the means at the end of the shaft for facilitating turning thereof is a flat sided head.

* * * * *